US007177601B1

(12) United States Patent
Kurk et al.

(10) Patent No.: US 7,177,601 B1
(45) Date of Patent: Feb. 13, 2007

(54) METHOD AND APPARATUS FOR TRANSCEIVING DATA USING A BIMODAL POWER DATA LINK TRANSCEIVER DEVICE

(75) Inventors: Thomas R. Kurk, Indianapolis, IN (US); Thomas D. Minning, Cumberland, IN (US); Michael J. Hoffman, Indianapolis, IN (US); Harold Jefferson Wood, New Palestine, IN (US)

(73) Assignee: Raytheon Company, Waltham, MA (US)

( * ) Notice: Subject to any disclaimer, the term of this patent is extended or adjusted under 35 U.S.C. 154(b) by 740 days.

(21) Appl. No.: 10/008,585

(22) Filed: Nov. 2, 2001

(51) Int. Cl.
*H04B 1/38* (2006.01)
*H04B 1/40* (2006.01)
*H04B 7/00* (2006.01)

(52) U.S. Cl. .................. 455/73; 455/90.1; 455/260; 455/264; 455/265

(58) Field of Classification Search .................. 455/73, 455/82, 83, 90.1, 41.2, 127.1, 90.2, 127.5, 455/343.5, 76, 78, 84–87, 260, 264–265
See application file for complete search history.

(56) References Cited

U.S. PATENT DOCUMENTS 3,945,008 A * 3/1976 Schmucker .................. 342/68
5,448,110 A * 9/1995 Tuttle et al. ................. 257/723
5,612,532 A * 3/1997 Iwasaki ........................ 235/492
5,619,190 A * 4/1997 Duckworth et al. ....... 340/5.25
5,686,868 A * 11/1997 Hasegawa et al. ............ 331/75
5,752,169 A * 5/1998 Hareyama et al. ............ 455/76
6,014,932 A   1/2000 Mardirossian
6,137,995 A * 10/2000 Durec et al. .................. 455/75
6,363,854 B1 * 4/2002 Schweitzer .................. 102/401
6,392,486 B1 * 5/2002 Lemay, Jr. .................. 330/253

OTHER PUBLICATIONS

BlueChip Communication AS, "BCC418 UHF transceiver", reference manual rev. 1.0, complete document.*
BlueChip Communication AS, "BCC418 UHF transceiver", reference manual rev. 1.0, complete document.*
Bluechip Communications As, "BCC418 UHF transciver", Dec. 19, 2000, pp. 1-13, rev. 1.0 (Blue Chip Communication AS, Hovfaret 17B, 0275 Oslo, Norway).

* cited by examiner

*Primary Examiner*—Lester G. Kincaid
*Assistant Examiner*—Matthew C Sams
(74) *Attorney, Agent, or Firm*—Daly, Crowley, Mofford & Durkee, LLP (57) ABSTRACT

A bimodal power data link transceiver device (33) is provided. The device comprises a transceiver integrated circuit (IC) (14); wherein the IC comprises an oscillator (150), a frequency reference port, and a RF output port. A VCO (12) is coupled to the oscillator and a direct digital synthesizer (15) is coupled to the frequency reference port. The combination allows the IC to operate below 200 MHz. In addition, an external power amplifier (19) is connected to the RF output port thus allowing for burst RF communications at a higher power than the quiescent receive mode.

26 Claims, 5 Drawing Sheets

METHOD AND APPARATUS FOR TRANSCEIVING DATA USING A BIMODAL POWER DATA LINK TRANSCEIVER DEVICE

BACKGROUND OF THE INVENTION

1. Field of the Invention

The present invention relates to data link transceivers and, more particularly, to data link transceivers requiring low receiver power and high burst transmission power.

2. Prior Art

A number of user applications continue to drive the requirement for low power transceivers capable of radio frequency communication. These applications include battery powered smart weapons capable of being remotely armed or disarmed, or simply located. Specific examples may include explosive mines, of the land or sea variety, missiles, or even small arms. The need for low power transceivers in mines is clear when considering thousands of deployed and armed land mines that are left after a conflict. These armed and very dangerous land mines essentially continue the original conflict against unarmed non-combatants and are of grave public concern as well as the subject of international treaties. Thus, there exists a need for arming or disarming the mines as necessary. There also exist a need for locating mines for removal or rendering inoperative, i.e., exploding the mine. It has been suggested in the prior art that this functionality for arming or disarming mines may be accomplished by a transceiver—see U.S. Pat. No. 6,014,932. Yet, a simple transceiver with its high receiver power requirements falls short when considering that devices such as land mines are battery powered—and that the mine may need to be controlled over many months with the landmine in a continuous receive mode. The power availability problem is exacerbated in smaller devices with smaller power cells; nor does providing larger or more power cells solve the problem since many devices such as landmines have weight or size limitations.

In addition, because the many users in a combat environment crowd the electromagnetic spectrum, communications with the landmine must be within a certain predefined range, such as below 200 MHz.

Thus, the above suggests a need for a transceiver having low power requirements. Such a low power transceiver may be fabricated through an Application Specific Integrated Circuit (ASIC). Yet, ASICs, custom made integrated circuits, are expensive and generally cost prohibitive due to their relatively limited production runs. On the other hand, commercial transceivers having low power consumption generally fall into the very high frequency range category, on the order of giga-hertz, well above the 200 MHz operating region of a landmine, and/or fail to have enough power to operate in a burst transmission mode.

SUMMARY OF THE INVENTION

In accordance with one embodiment of the invention a bimodal power data link transceiver device is provided. The device comprises a transceiver integrated circuit (IC), having: a transmitter, a receiver; a second power amplifier coupled to a first power amplifier; a transmit/receive switch coupled to the second power amplifier and the receiver; a controller coupled to the transceiver IC; a direct digital frequency synthesizer coupled to the transceiver IC; a second voltage controlled oscillator (VCO) coupled to the transmitter; and a loop filter coupled to the second VCO and the transceiver IC.

In accordance with another embodiment the invention includes a method for transceiving data in a device adapted to transceiving data in the radio frequency spectrum below 200 MHz. The method includes the steps of providing a transceiver integrated circuit (IC), the transceiver IC having an oscillator input port, a frequency reference port, a radio frequency input port, a radio frequency output port, and a phase detector output port. The steps include generating a voltage controlled oscillator (VCO) signal for input to an IC oscillator port. The steps include coupling a direct digital synthesizer (DDS) to an IC frequency reference port; and coupling the radio frequency output port to a power amplifier; and coupling a radio frequency input port to a transmit/receive switch.

The method may also include operating the device in a quiescent baseline receiver mode, wherein the quiescent baseline receiver mode comprises a first power mode; operating the device in a burst transmit mode when not in the quiescent baseline receiver mode, wherein the burst transmit mode comprises a second power mode, wherein the second power mode is greater than the first power mode; operating the device with a transmit/receive time ratio less than 1.5; and transceiving a RF carrier frequency less than 200 MHz.

Another embodiment of the invention is directed towards an improved bimodal power data link transceiver device. The device includes a receiver section; a transmitter section; and a phased locked loop (PLL) frequency generator section. The PLL frequency generator section has a voltage-controlled oscillator (VCO), and a direct digital synthesizer (DDS). The PLL frequency generator is coupled to the receiver section and the transmitter section, while a controller section is coupled to the PLL frequency generator section and the receiver section.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 3:
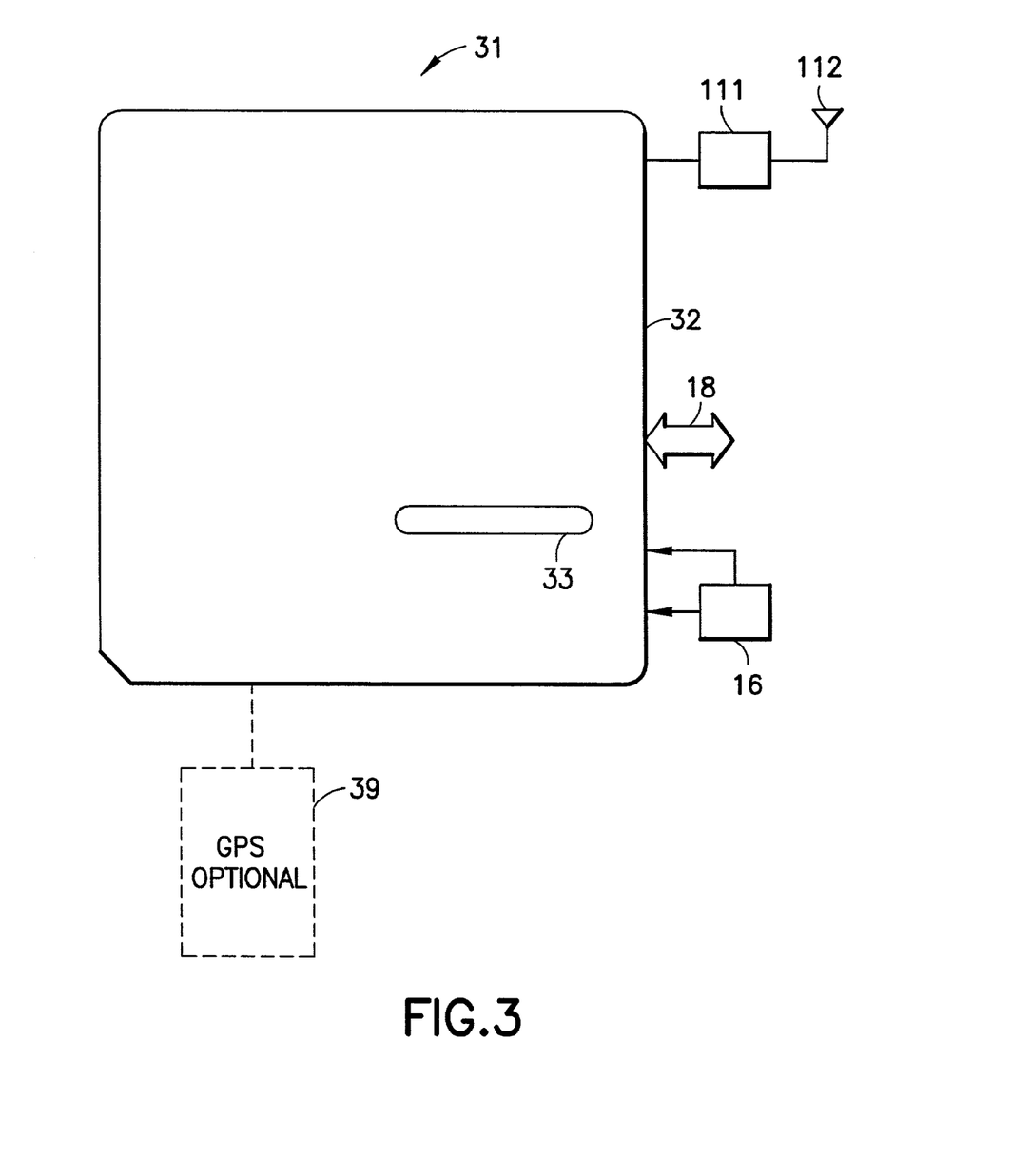
FIG. 3 is a pictorial block diagram incorporating features of the present invention.

Referring to FIG. 3, there is shown a block diagram of a system 31 incorporating features of the present invention. The system 31 could be any suitable battery powered system requiring radio frequency transceiving functionality. Exemplary, but not limiting embodiments include: remote control and/or identification of mines of the land or sea variety, or similarly, remote control and/or identification of small arms weapons. In an alternate embodiment, system 31 could be any suitable type of system with Global Positioning System (GPS) 39 functionality; where the position of the system is transmitted to a remote location, e.g., positional information of sea mines in a mine field or the whereabouts of a particular small arms weapon. It should further be appreciated that these teachings apply as well to commercial and consumer applications.

Thus, although the present invention will be described with reference to the embodiments shown in the drawings, it should be understood that the present invention could be embodied in many alternate forms of embodiments.

As used in this specification, a bimodal power data link transceiver device is defined as a transceiver device having a receiver power mode different from the transmission power mode, i.e., that consumes a different amount of current when receiving than when transmitting.

Still referring to FIG. 3, there is shown one embodiment of a system 31 incorporating features of the present invention. The RF transceiver device 33 is used in battery-powered systems requiring RF transceiving functionality. The battery-powered systems generally comprises a device 32 such as a smart landmine, i.e., the landmine may be armed, detonated, or located remotely, a clock 16 for timing, a data bus connection 18, a bandpass filter 111, and an antenna 112.

The antenna 112 may be any suitable antenna or combination of antennas designed for transmission and/or reception of signals.

The bandpass filter 111 may be any suitable type of filter designed to pass the frequencies of interest for transmission or reception. It will be readily appreciated by one skilled in the art that the bandpass filter 111 may have different passbands for reception and transmission.

The data bus connection 18 may be any suitable type of physical data bus for transferring data between subsystems such as computer software configuration items (CSCI) and/or hardware configuration items (HWCI). It will be readily appreciated by one skilled in the art that the data bus may be serial, such as a uniform serial bus (USB) or a parallel data bus. It will also be readily appreciated by one skilled in the art that the data bus 18 may also be a combination of parallel and serial buses. In alternate embodiments the data bus 18 may include fiber optic lines or light emitting diode (LED) transmitting devices.

Clock 16 may be any suitable type of clock device, such as a crystal oscillator. It will be readily appreciated by one skilled in the art that the clock 16 may be a dedicated clock, or that the clock may be a master clock for synchronizing subsystems within the device 31. In alternate embodiments the clock 16 may be collocated with the device 31 or, for security purposes, may be physically located elsewhere, and the clock signal is transmitted to device 31 as required.

Figure 1:
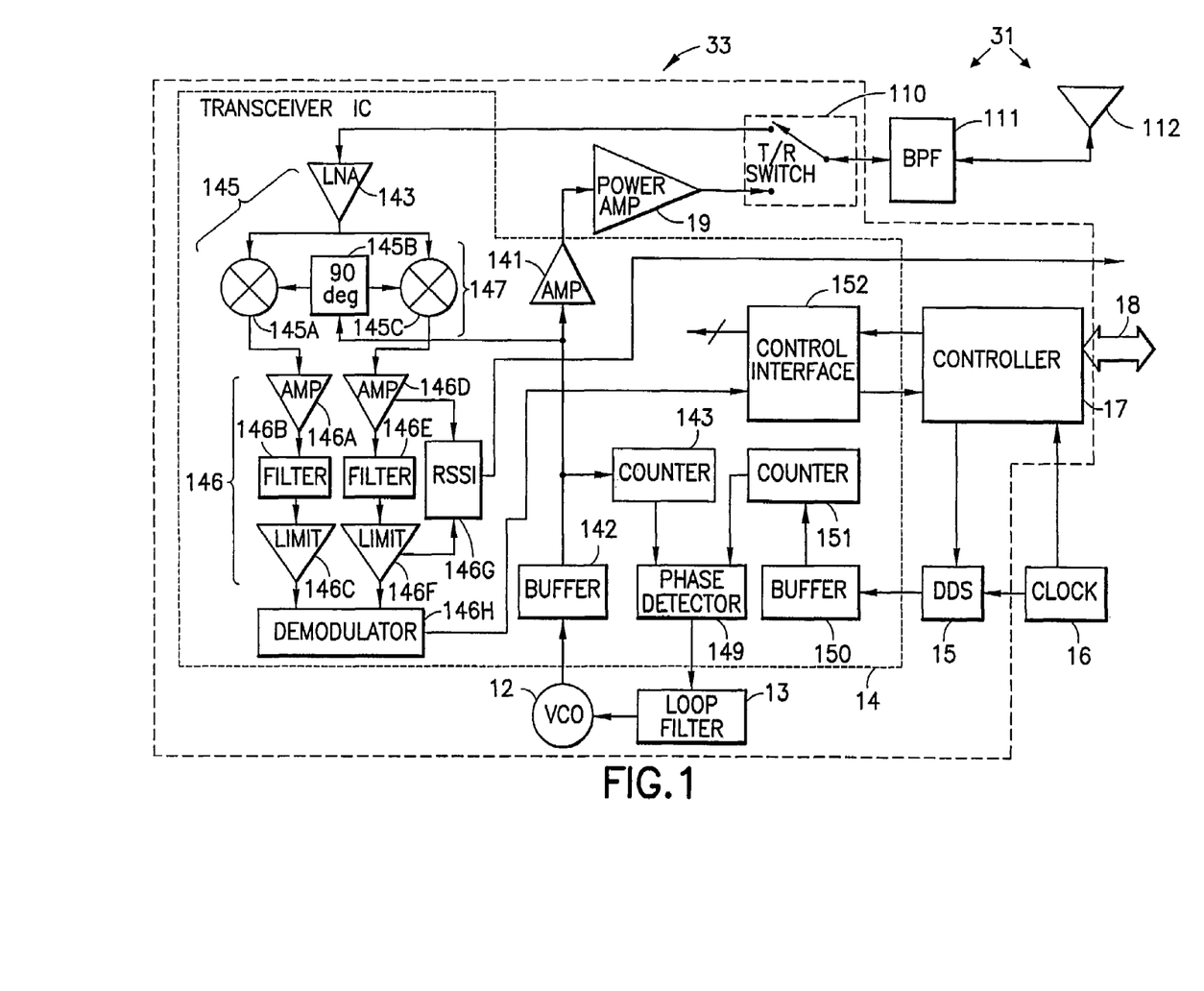
FIG. 1 is a transceiver IC circuit block diagram incorporating features of the present invention shown in FIG. 3.

Referring also to FIG. 1, there is shown a block diagram of a system 33 incorporating features of the present invention.

Transceiver IC 14 may be any suitable type of transceiver IC. The transceiver IC 14 could be a Blue Chip Communication™ BCC 418UHF Transceiver. In general, any suitable transceiver with similar characteristics could be used. It will be appreciated that a novel feature of the present invention allows commercial off the shelf transceiver ICs to be adapted to applications not originally intended by the IC manufacturer. For example, the aforementioned 418UHF transceiver is designed to operate at a minimum frequency of 300 MHz. However, features of the present invention in the preferred embodiment adapt the IC to operate well below the specified frequency and yet maintain the IC's desirable operating characteristics. In addition, the remnants of the IC's internal VCO may then be utilized for other functions not originally anticipated by the manufacturer. In the preferred embodiment the partial VCO within the 418 UHF IC is utilized as an emitter follower circuit or buffer 142. In alternate embodiments the remnants may be utilized as filters. As noted, features of the present invention permit the IC to be used in applications not originally contemplated by its manufacturer. With general regard to transceiver ICs, reference can be had to "BCC418 UHF transceiver" reference manual, rev. 1.0, the disclosure of which is incorporated by reference in its entirety.

Figure 4:
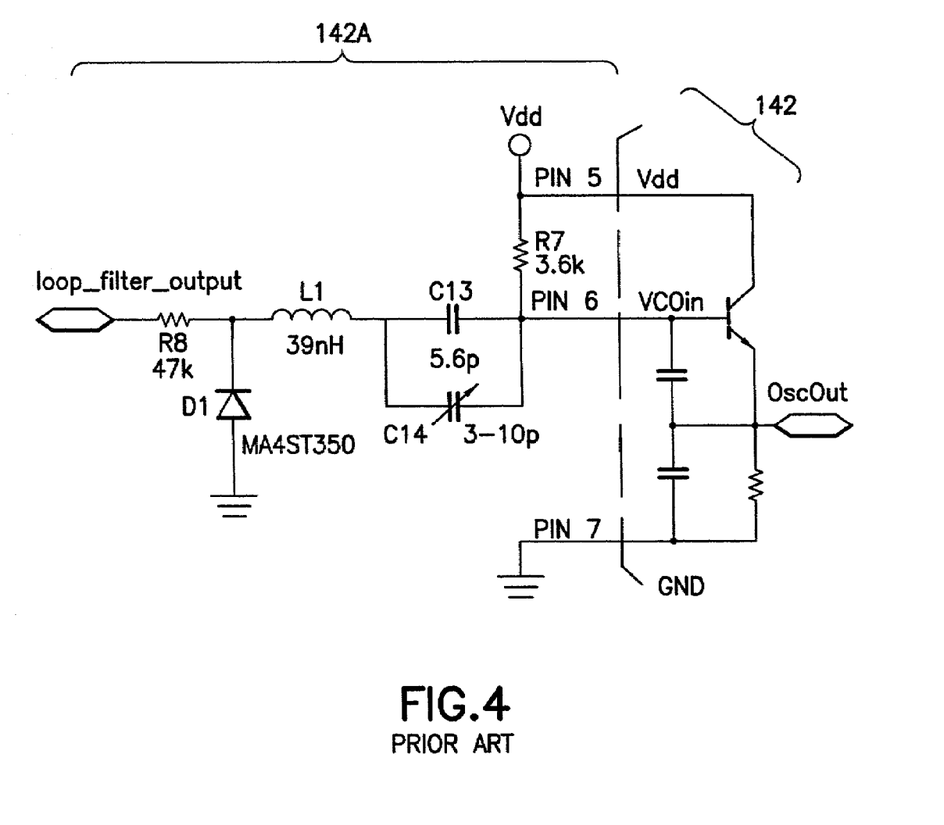
FIG. 4 is a circuit schematic of a typical voltage controlled oscillator (VCO)

In an alternate embodiment any suitable type of low power transceiver IC could be provided, such as the one shown partially in FIG. 4. It will be appreciated by one skilled in the art that a suitable transceiver IC will contain a partial VCO and will provide terminals where external frequency-setting components 142A are to be provided to complete the construction of the VCO. An example is shown in FIG. 4.

In the preferred embodiment the components 142A external to the IC 14 are replaced with a complete VCO (FIG. 1, item 12). The VCO 12 may be any suitable type of VCO, for example a Colpitts Oscillator, for use with the transceiver IC 14. In the preferred embodiment the VCO 12 is designed to operate the transceiver IC 14 below 200 MHz. An operational example of the preferred embodiment is shown in FIG. 5.

Figure 5:
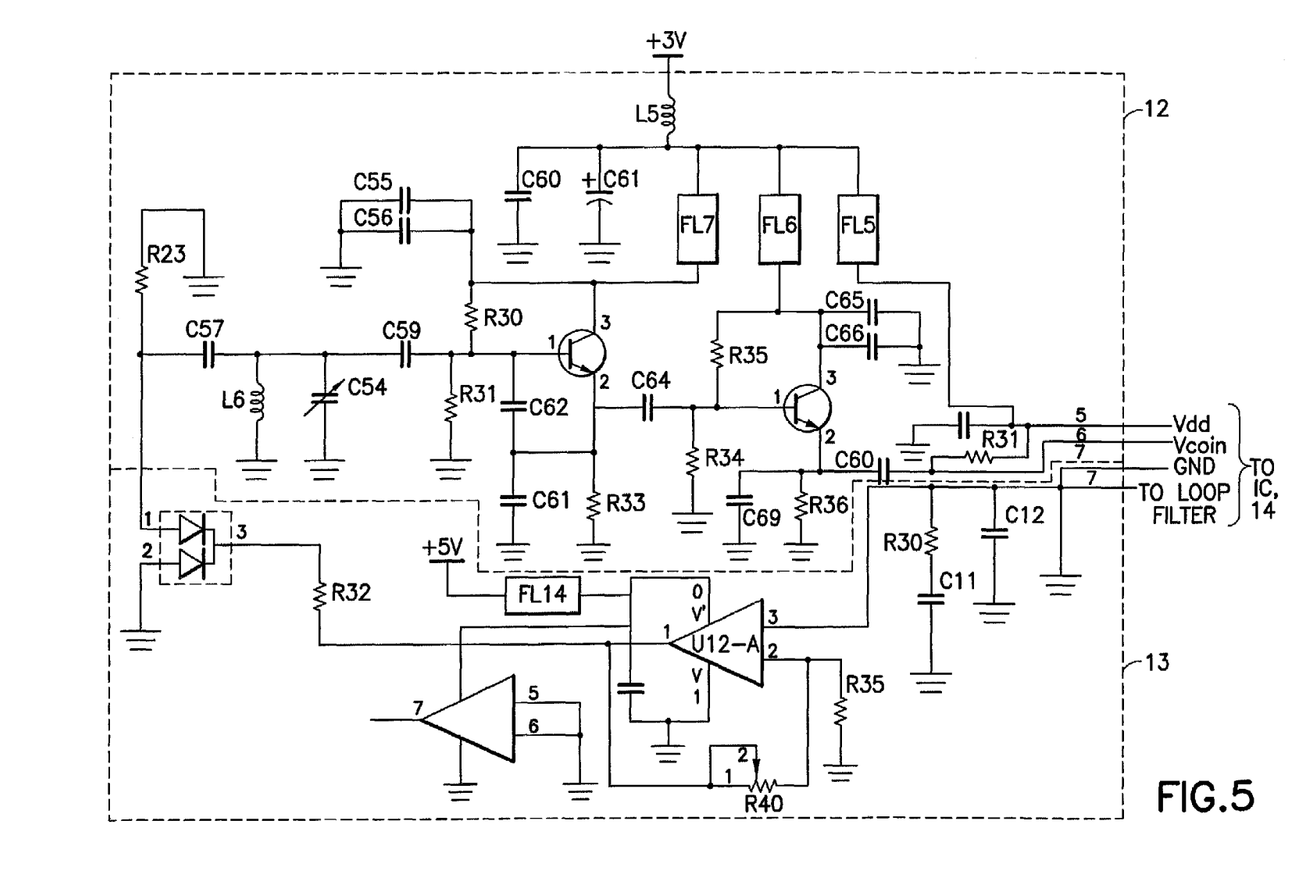
FIG. 5 is an exemplary detailed circuit schematic of items 12 and 13, of a voltage controlled oscillator and a loop filter, respectively, incorporating features of the present invention shown in FIG. 1.

Still referring to FIGS. 1 and 5, loop filter 13 may be any suitable type of filter for optimizing parameters such as FSK modulation rates, PLL lock times, bandwidth, and phase noise. In alternate embodiments dual loop filters may be provided. Loop filters are well known in the art and will not be discussed further. An operational example of the preferred embodiment is shown in FIG. 5

Direct digital frequency synthesizer (DDS) 15 is used to drive buffer 150. In the preferred embodiment buffer 150 is a crystal oscillator capable of being driven by an external frequency source such as the DDS 15. This permits the transceiver to be tuned to the desired channel frequency and/or the transmitter FSK modulation to be set when the DDS 15 controls the reference frequency. In an alternate embodiment DDS 15 may be any suitable frequency agile device or devices capable of introducing various frequency modulations, such as frequency shift keying (FSK) or phase shift keying (PSK).

Clock 16 may be any suitable type of device for providing timing signals. In an alternate embodiment the clock may be remote from the transceiver IC 14. Clocks and timing signals are well known in the art and need not be discussed here.

Controller 17 may be any suitable type of controller capable of controlling transceiver IC 14 and DDS 15.

Transmit/Receive switch 110 may be any suitable RF switch for switching the antenna 112 between transmit and receive sections of the transceiver IC 14. In alternate embodiments the transmit/receive switch could comprise two pin diodes for maximum input sensitivity and output power.

Power amplifier 19 may be any suitable RF power amplifier.

Figure 2:
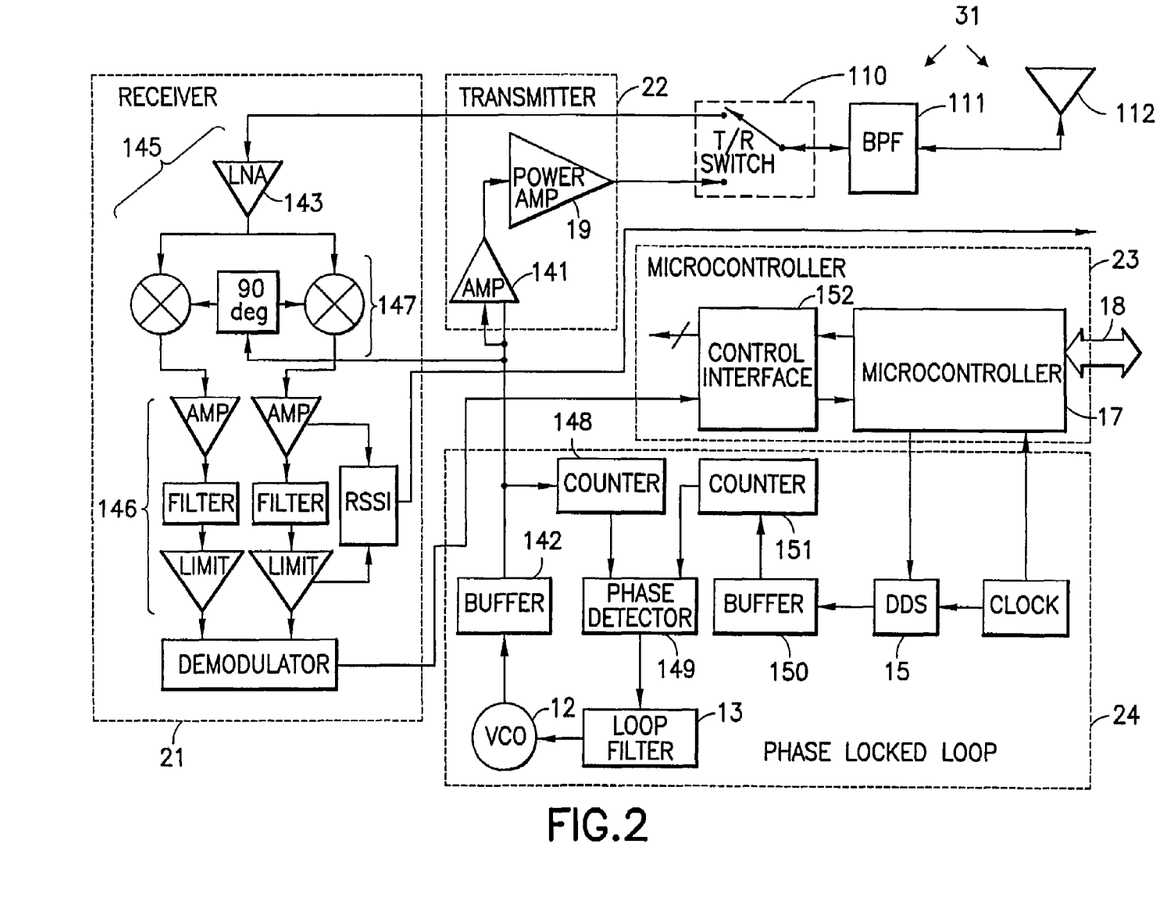
FIG. 2 is a functional block diagram of the circuit shown in FIG. 1.

Referring also to FIG. 2 there is shown a functional block diagram of the system shown in FIG. 3.

Transceiver 31 is a radio device for the transmission and reception of digital data. When used with a controller 17 it forms one terminal of a data link. The transceiver may be incorporated into equipment that is easily carried by a person on foot because it is small and lightweight. The preferred embodiment is also low power, on the order of 10 milliamps in the predominant receive mode. There are four main functional blocks, Phase Locked Loop 24, Receiver 21, Transmitter 22, and Micro-controller 23.

A signal enters the transceiver via the antenna 112 and is coupled to the receiver section 21 via the t/r switch 110 and the bandpass filter 111. The receiver block 21 detects incoming RF signals and extracts the digital data contained in the signals. The digital data from the receiver section 21 is sent to an external data processor via bus 18 and micro-controller 23. In the preferred embodiment the receiver 21 uses a direct conversion architecture in which the incoming signal is amplified by a low noise preamplifier 143 and converted directly to base-band for further amplification, filtering and detection via mixers 145,147 and channel path components 146A–146H. In the preferred embodiment the output of the low noise amplifier 143 is coupled to the quadrature product detector 145,147 for conversion to two base-band signals 90 degrees out-phase. Both baseband signals are amplified and filtered by active low pass filters 146B,146E. The bandwidth of the base-band filters 146B,146E is selectable so that various bandwidth signals may be received without the necessity of modifying the circuit. Filter bandwidths are selectable by the micro-controller 17. The baseband signals are then coupled to the demodulator 146H. In the preferred embodiment the use of the direct conversion receiver simplifies the receiver because it eliminates the need for tuned amplifiers and filters at an intermediate frequency (IF).

The Received Signal Strength Indicator (RSSI) detects the presence of a received signal. A signal appearing on the RSSI is used to turn on sections that are normally powered down to conserve power. In an alternate embodiment the RSSI signal could be used to activate a GPS (FIG. 3, item 39) subsystem in order to determine the device location. In this alternate embodiment the positional latitude and longitude information from the activated GPS could be linked to micro-controller 17; micro-controller 17 encodes the information through DDS 15, which subsequently modulates the RF carrier emanating from VCO 12. Alternatively, modulation of the carrier wave may also be achieved in this alternate embodiment, or in any of the other embodiments by modulating the VCO 12 directly.

In the transmit mode, the output of the power amplifier 141 is turned on and the transmitter output is frequency shift keying (FSK) modulated by setting the output frequency of the DDS 15 to the appropriate mark and space frequencies. It will be readily appreciated that prior to the turn on of the power amplifier 141 the device is advantageously in a low power receive state. The PLL output frequency from the PLL section 24 to the output amplifier 141 dynamically tracks reference frequency marks and spaces from the DDS 15. Thus, advantageously, the output of PLL section 24 is dynamically tuned to the transmit frequency and in this manner the output RF signal is FSK modulated. In an alternate embodiment other modulation schemes could be employed in a similar fashion. As stated above, modulation of the carrier wave may also be achieved by modulating the VCO 12 directly.

The micro-controller section 23 controls the transceiver 14 and provides a digital interface with data bus 18. The controller 17 programs the frequency of the DDS 15 and the transceiver IC 14.

It should be understood that the foregoing description is only illustrative of the invention. Moreover, it will be readily appreciated that an advantage of the present invention is the use of inexpensive commercial off the shelf (COTS) components for military applications. It will be further appreciated that advantages of the present invention include low power, low weight, RF transceiver operation. Thus, various alternatives and modifications can be devised by those skilled in the art without departing from the invention. For example, the relatively small size of the invention could permit alternate embodiments with a GPS system being covertly installed in a variety of objects for later relocation. Examples could be locating stolen automobiles, marine vessels, computers, or virtually any object capable of containing the device. Accordingly, the present invention is intended to embrace all such alternatives, modifications and variances that fall within the scope of the appended claims.

What is claimed is:

1. A bimodal power data link transceiver device, the device comprising:
    a transceiver integrated circuit (IC), the transceiver IC comprising:
        a transmitter, the transmitter having;
            partial voltage controlled oscillator (VCO) designed to accept at least one input from frequency setting components external to the transceiver IC and in combination with the frequency setting components to produce a first clock signal at a first frequency set by the frequency setting components;
            a first power amplifier, the first power amplifier coupled to the partial VCO; and
        a receiver;
    a second power amplifier coupled to the first power amplifier;
    a transmit/receive switch coupled to the second power amplifier and the receiver;
    a controller coupled to the transceiver IC;
    a direct digital frequency synthesizer having an output coupled to an input of the transceiver IC;
    a complete voltage controlled oscillator (VCO) coupled to the partial VCO, the complete VCO configured to produce a second clock signal at a second frequency and to couple the second clock signal to the partial VCO the complete VCO further configured to utilize the partial VCO as one of an emitter follower circuit, a buffer or a filter; and
    a loop filter coupled to the complete VCO and the transceiver IC.

2. A bimodal power data link transceiver device as in claim 1, wherein the partial VCO, complete VCO, and the loop filter form part of a phase locked loop (PLL), wherein the PLL and the transceiver IC further comprise:
    a phase detector coupled to the loop filter; and
    a crystal oscillator coupled to the phase detector.

3. A bimodal power data link transceiver device as in claim 1, wherein the receiver comprises:
    a low noise amplifier;
    a quadrature mixer pair, the quadrature mixer pair coupled to the low noise amplifier and the PLL frequency synthesizer, the quadrature mixer pair having:
        a first quadrature signal;
        a second quadrature signal;
    a demodulator;
    a first signal channel, the first signal channel coupling the first quadrature signal to the demodulator; and
    a second signal channel, the second signal channel coupling the second quadrature signal to the demodulator.

4. A bimodal power data link transceiver device as in claim 1, wherein the transceiver IC comprises at least one field programmable gate array (FPGA).

5. A bimodal power data link transceiver device as in claim 1 wherein the transmit/receive switch comprises a plurality of diodes.

6. A method for transceiving data in a device adapted to transceive data in the radio frequency spectrum, the method comprising:
providing a transceiver integrated circuit (IC), the transceiver IC having:
a partial voltage controlled oscillator (VCO) designed to accept at least one input from frequency setting components external to the transceiver IC and in combination with the frequency setting components to produce a first clock signal at a first frequency set by the frequency setting components;
an oscillator input port coupled to the partial VCO;
a frequency reference port;
a radio frequency input port;
a radio frequency output port;
a phase detector output port;
using a complete VCO, generating a VCO signal for input to the oscillator input port, the VCO signal comprising a second clock signal at a second frequency, the complete VCO configured to utilize the partial VCO as one of an emitter follower circuit, a buffer, or a filter;
coupling a direct digital synthesizer (DDS) to the frequency reference port;
coupling the radio frequency output port to a power amplifier; and
coupling the radio frequency input port to a transmit/receive switch.

7. A method as in claim 6 wherein providing a transceiver IC further comprises:
providing a field programmable gate array (FPGA); and
programming the FPGA to operate as a transceiver.

8. A method as in claim 6 wherein the step of generating a VCO signal for input to the oscillator port further comprises;
coupling the phase detector output port to at least one loop filter; and
coupling the at least one loop filter to the complete VCO.

9. A method as in claim 6 wherein coupling a DDS to the frequency reference port further comprises coupling a first microprocessor controller to the DDS.

10. A method as in claim 9 wherein coupling the first microprocessor controller to the DDS further comprises setting a center transmit frequency.

11. A method as in claim 9 wherein coupling the first microprocessor controller to the DDS further comprises modulating a transmit frequency.

12. A method as in claim 6 further comprising:
operating the device in a quiescent baseline receiver mode, wherein the quiescent baseline receiver mode comprises a first power mode;
operating the device in a burst transmit mode when not in the quiescent baseline receiver mode, wherein the burst transmit mode comprises a second power mode, wherein the second power mode is greater than the first power mode;
operating the device with a transmit/receive time ratio less than 1.5; and
transceiving a RF carrier frequency less than 200 MHz.

13. A method as in claim 6 further comprising operating the device with a global positioning indicator.

14. A method as in claim 6 further comprising transceiving data in weapons munitions, wherein transceiving data in weapons munitions further comprises transmitting frequency shift key (FSK) modulated signals.

15. A method as in claim 6 further comprising transceiving-data in a landmine.

16. A bimodal power data link transceiver device, the device comprising:
a receiver section;
a transmitter section;
a phased locked loop (PLL) frequency generator section, wherein the PLL frequency generator section comprises:
a complete voltage controlled oscillator (VCO);
an integrated circuit (IC), wherein the integrated circuit comprises:
a buffer, wherein the buffer is coupled to the complete VCO, and wherein the buffer comprises:
a partial VCO designed to accept at least one input from frequency setting components external to the transceiver IC and in combination with the frequency setting components to produce a first clock signal at a first frequency set by the frequency setting components, wherein the complete VCO is configured to produce a second clock signal at a second frequency and to couple the second clock signal to the partial VCO, the complete VCO further configured to utilize the partial VCO as the buffer,
a digital direct synthesizer (DDS), wherein the DDS is coupled to the IC; and
a controller section, the controller section coupled to the PLL frequency generator section and the receiver section.

17. A bimodal power data link transceiver device as in claim 16, wherein the transmitter section comprises:
the IC, the IC further comprising:
a first amplifier, wherein the first amplifier is coupled to the PLL frequency generator section; and
a second amplifier, the second amplifier coupled to the first amplifier.

18. A bimodal power data link transceiver device as in claim 16, wherein the receiver section comprises:
a low noise amplifier;
a quadrature mixer pair coupled to the low noise amplifier; and
a demodulator coupled to the quadrature mixer pair.

19. A bimodal power data link transceiver device as in claim 16, wherein the device is adapted to fit in a weapon.

20. A bimodal power data link transceiver device as in claim 19 wherein the weapon comprises a landmine.

21. A bimodal power data link transceiver device as in claim 19 wherein the weapon comprises a sea mine.

22. A bimodal power data link transceiver device as in claim 1, wherein the transceiver IC is configured to operate at and above a first frequency and wherein the complete VCO is configured to operate the transceiver IC at a second frequency smaller than the first frequency.

23. A method as in claim 6, wherein the transceiver IC is designed to operate at and above the first frequency and wherein the second frequency is smaller than the first frequency.

24. A bimodal power data link transceiver device as in claim 16, wherein the integrated circuit is configured to operate at and above the first frequency, and wherein the second frequency is smaller than the first frequency.

25. A bimodal power data link transceiver device, the device comprising:
a transceiver integrated circuit (IC) designed to operate at and above a first frequency, the transceiver IC comprising:

a transmitter, the transmitter having:
  a partial voltage controlled oscillator (VCO) designed to accept at least one input from frequency setting components external to the transceiver IC and in combination with the frequency setting components to produce a first clock signal at the first frequency set by the frequency setting components;
  a first power amplifier, the first power amplifier coupled to the partial VCO; and
  a receiver coupled to the partial VCO,
a second power amplifier coupled to the first power amplifier;
a transmit/receive switch coupled to the second power amplifier and the receiver;
a controller coupled to the transceiver IC;
a direct digital frequency synthesizer coupled to the controller and having an output coupled to an input of the transceiver IC;
a complete voltage controlled oscillator (VCO) coupled to the partial VCO, wherein the complete VCO is configured to operate the transceiver IC at a second frequency smaller than the first frequency, the complete VCO configured to produce a second clock signal at the second frequency, the complete VCO further configured to utilize the partial VCO as one of an emitter follower circuit, a buffer, or a filter; and
a loop filter coupled to the complete VCO and the transceiver IC.

26. The device of claim 25, wherein the first frequency is 300 megahertz (MHz) and the second frequency is 200 MHz.

* * * * *

UNITED STATES PATENT AND TRADEMARK OFFICE
CERTIFICATE OF CORRECTION

PATENT NO. : 7,177,601 B1
APPLICATION NO. : 10/008585
DATED : February 13, 2007
INVENTOR(S) : Thomas R. Kurk et al.

It is certified that error appears in the above-identified patent and that said Letters Patent is hereby corrected as shown below:

Col. 1, line 60, delete "the invention a" and replace with --the invention, a--.

Col. 2, line 4, delete "embodiment the" and replace with -- embodiment, the--.

Col. 2, lines 59-60, delete "of a system 31" and replace with --of system 31 --.

Col. 3, line 20, delete "comprises" and replace with --comprise--.

Col. 3, line 41, delete "embodiments the" and replace with --embodiments, the--.

Col. 3, lines 48-49, delete "embodiments the," and replace with --embodiments, the--.

Col. 3, line 60, delete "off the shelf" and replace with --off-the-shelf--.

Col. 4, lines 2-3, delete "embodiment the" and replace with -- embodiment, the--.

Col. 4, lines 4-5, delete "embodiments the" and replace with -- embodiments, the --.

Col. 4, line 12, delete "embodiment any" and replace with --entitled embodiment, any--.

Col. 4, line 20, delete "embodiment the" and replace with -- embodiment, the --.

Col. 4, line 24, delete "embodiment the" and replace with -- embodiment, the --.

Col. 4, line 31, delete "embodiments dual" and replace with --embodiments, dual--.

Col. 4, line 36, delete "embodiment buffer" and replace with --embodiment, buffer--.

Col. 4, lines 41-42, delete "embodiment DDS15" and replace with --embodiment, DDS 15--.

Col. 4, line 47, delete "embodiment the" and replace with --embodiment, the--.

Col. 4, lines 54-55, delete "embodiments the" and replace with --embodiments, the--.

Col. 4, line 60, delete "FIG. 2 there" and replace with --FIG. 2, there--.

Col. 5, line 10, delete "embodiment the" and replace with --embodiment, the--.

Col. 5, line 15, delete "embodiment the" and replace with --embodiment, the--.

UNITED STATES PATENT AND TRADEMARK OFFICE
CERTIFICATE OF CORRECTION

PATENT NO. : 7,177,601 B1
APPLICATION NO. : 10/008585
DATED : February 13, 2007
INVENTOR(S) : Thomas R. Kurk et al.

It is certified that error appears in the above-identified patent and that said Letters Patent is hereby corrected as shown below:

Col. 5, line 25, delete "embodiment the" and replace with --embodiment, the--.

Col. 5, line 31, delete "embodiment the" and replace with --embodiment, the--.

Col. 5, line 34, delete "embodiment the" and replace with --embodiment, the--.

Col. 5, line 54, delete "embodiment other" and replace with --embodiment, other--.

Col. 5, line 65, delete "off the shelf" and replace with --off-the-shelf--.

Col. 8, lines 1-2, delete "transceiving-data" and replace with --transceiving data--.

Signed and Sealed this

Thirty-first Day of July, 2007

JON W. DUDAS
*Director of the United States Patent and Trademark Office*